Figure 1:
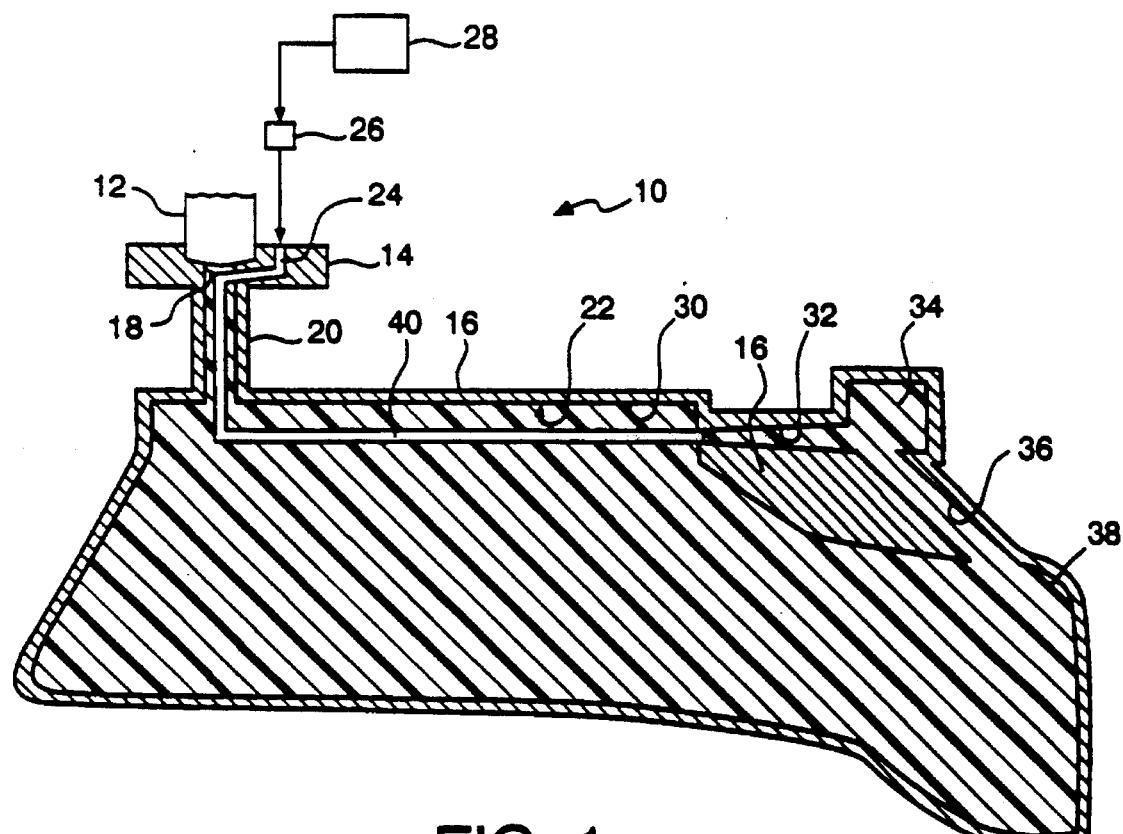

United States Patent [19]

Ladney

[11] Patent Number: 5,556,650

[45] Date of Patent: Sep. 17, 1996

[54] INJECTION MOLDING SYSTEM UTILIZING PRIMARY AND SECONDARY RESIN FLOW PATHS

[75] Inventor: Michael Ladney, Naples, Fla.

[73] Assignee: Melea Limited, Southfield, Mich.

[21] Appl. No.: 401,814

[22] Filed: Mar. 10, 1995

Related U.S. Application Data

[62] Division of Ser. No. 183,509, Jan. 18, 1994, Pat. No. 5,417,916.

[51] Int. Cl.$^6$ ............................................. B29C 45/00
[52] U.S. Cl. ............... 425/546; 264/328.8; 264/328.120; 264/328.130; 264/572; 425/557; 425/573
[58] Field of Search ..................... 425/130, 573, 425/546, 557; 264/328.12, 572, 328.8, 328.13

[56] References Cited

U.S. PATENT DOCUMENTS

| | | | |
|---|---|---|---|
| 5,069,858 | 12/1991 | Hendry | 264/572 |
| 5,098,637 | 3/1992 | Hendry. | |
| 5,204,050 | 4/1993 | Loren | 264/572 |
| 5,254,306 | 10/1993 | Inada et al. | 425/130 |

OTHER PUBLICATIONS

Article entitled: "Gas Assisted Injection Molding — The New Thermoplastic Molding Technology for Exterior Body Panels" by Dr. Ken C. Rusch, presented at a meeting of the Society of Automotive Engineers, Mar. 2, 1989.

*Primary Examiner*—Jay H. Woo
*Assistant Examiner*—Joseph Leyson
*Attorney, Agent, or Firm*—Brooks & Kushman P.C.

[57] ABSTRACT

A system for injection molding a hollow plastic article utilizing a secondary resin flow path which communicates one portion of an article-defining cavity with a second portion of the article-defining cavity. The second portion of the article-defining cavity is typically the hardest-to-fill area of the article-defining cavity. The secondary resin flow path is outside of the article-defining cavity and the normal flow of plastic resin.

1 Claim, 1 Drawing Sheet

5,556,650

INJECTION MOLDING SYSTEM UTILIZING PRIMARY AND SECONDARY RESIN FLOW PATHS

This is a divisional of application Ser. No. 08/183,509 filed n Jan. 18, 1994 now U.S. Pat. No. 5,417,916.

TECHNICAL FIELD

This invention relates to methods and systems for injection molding hollow plastic articles utilizing charges of high pressure fluid and, in particular, to methods and systems for injection molding hollow plastic articles utilizing charges of high pressure fluid to fill hard-to-fill portions of article-defining cavities.

BACKGROUND ART

In recent years, attention has been drawn to the use of gas assistance with conventional plastic injection molding to attain the product quality and productivity which had been hoped for with structural foam molding. The features of surface quality, lower clamp tonnage, rapid cycle times, weight reduction, material savings and minimization of part distortion or warpage can all be obtained with proper utilization of gas assistance with a conventional plastic injection molding process.

However, as the dimensions of the molded article increase, the gas must do more work to migrate through the volume of the mold cavity to assist in setting up the article within the cavity. If the pressure of the gas is too great as it enters the mold cavity, there is a risk that it may rupture and blow-out the plastic within the mold cavity, i.e. the gas is not contained within the plastic. Thus, there have been practical limitations in the adaptation of gas injection in the plastic molding field.

The Henry U.S. Pat. No. 5,098,637, discloses a method for injection molding hollow plastic articles with pressurized gas which provides for displacement by the gas of a portion of the plastic from the mold cavity into a flow-coupled spill cavity. This feature enables plastic articles of relatively greater dimensions to be successfully molded with the advantages of established gas injection molding techniques.

Some molded parts need a large gas channel to eliminate a second part and secondary operations. Such gas channels may be ¾ to 1½ inches on a thin nominal wall part. Even with a large spill cavity to receive the plastic displaced by a gas charge, such a method is extremely difficult if not impossible.

The reason for this is that with large gas channels on thin nominal wall parts, the large channels act as large elongated runners with very little pressure required to fill the channel and increasing amounts of pressure required in the remote nominal wall area where the plastic flow front slows down and begins to solidify. This results in the nominal wall areas furthest from the gas channels filling last. This causes the effect known as permeation as the gas when injected tries to go to the area of least pressure or the path of least resistance. This results not only in permeation into the nominal walls, but also incomplete evacuation of resin from the area where the gas channel is to be located.

DISCLOSURE OF THE INVENTION

An object of the present invention is provide a method and system for injection molding hollow plastic articles having relatively large gas channels on articles with thin nominal walls without the use of a spill cavity.

Another object of the present invention is to provide a method and system for injection molding hollow plastic articles wherein the plastic material that would normally reside in a spill cavity acts as a secondary gate to fill wall areas of the article that are hard-to-fill.

In carrying out the above objects and other objects of the present invention, a method is provided for injection molding a hollow plastic article in a mold having an injection aperture and an article-defining cavity. The method includes the step of injecting an amount of molten plastic resin sufficient for the preparation of the plastic article along a primary resin flow path which extends from the injection aperture to a first portion of the article-defining cavity. The method also includes the step of injecting a charge of pressurized gas into the first portion of the article-defining cavity. The charge is of a pressure and quantity sufficient to displace a first portion of the molten plastic resin from the first portion of the article-defining cavity into a secondary resin flow path and thence, into a second portion of the article-defining cavity. The secondary resin flow path extends outside of the article-defining cavity from the first portion of the article-defining cavity to the second of the article-defining cavity. The method also includes the step of maintaining the gas charge under pressure within the mold while the plastic resin solidifies within the first and second portions of the article-defining cavity to form the hollow plastic article. Finally, the method includes the step of relieving the gas pressure from within the article-defining cavity.

Further in carrying out the above objects and other objects of the present invention, an injection molding system for injection molding a hollow plastic article is provided. The system includes a source of pressurized fluid, an injection nozzle, and a mold. The mold has an injection aperture, an article-defining cavity and a primary resin flow path which extends from the injection aperture to a first portion of the article-defining cavity. The mold includes the improvement of a secondary resin flow path extending outside of the article-defining cavity from the first portion of the article-defining cavity to a second portion of the article-defining cavity to communicate a first portion of the molten plastic resin displaced from the first portion of the article-defining cavity to the second portion of the article-defining cavity by a charge of pressurized gas from the source of pressurized fluid.

The above objects and other objects, features, and advantages of the present invention are readily apparent from the following detailed description of the best mode for carrying out the invention when taken in connection with the accompanying drawings.

BRIEF DESCRIPTION OF THE INVENTION

FIG. 1 is a schematic, front view, partially broken away and in cross-section, illustrating the method and system of the present invention; and FIG. 2 is a schematic perspective view of a part made by the method and system of the present invention after it has been injected from an injection mold.

BEST MODE FOR CARRYING OUT THE INVENTION

Referring now to the drawing figures, there is illustrated in FIG. 1 a schematic side view, partially broken away and in cross-section, of a plastic injection molding system generally indicated at 10. A nozzle 12 of a plastic injection molding machine is brought into registering position with a modified sprue bushing 14 associated with a mold, generally indicated at 16. The sprue bushing 14 may be of the type disclosed in U.S. Pat. No. 4,855,094. The sprue bushing 14 has a plastic flow path 18 formed at its center to permit the passage of molten plastic through a sprue 20 of a mold and into an article-defining cavity, generally indicated at 22.

The modified sprue bushing 14 also includes a gas path 24 to permit the introduction and venting of a charge of pressurized gas provided by a valve assembly 26. The valve assembly 26 controls a high pressure fluid such as nitrogen gas which is stored at a source 28 of the pressurized fluid. The valve assembly 26 typically provides the high pressure nitrogen gas at a regulated desired pressure which is less than the pressure of the nitrogen gas contained within the source 28 of pressurized nitrogen gas. The valve assembly 26 may be of the type disclosed in U.S. Pat. No. 5,443,087. entitled "Method and System for Controlling a Pressurized Fluid and Valve Assembly For Use Therein", having the same assignee as the assignee of the present application.

A first portion 30 of the mold cavity 22 is flow-coupled through a runner segment 32 to a spill cavity 34. In turn, the spill cavity 34 is flow-coupled through a second runner segment 36 to a second portion 38 of the article-defining cavity 22. Also, the first and second portions 30 and 38 are flow-coupled together so that a portion of the plastic resin which flows into the first portion 30 of the article-defining cavity 22 also flows into the second portion 38 of the article-defining cavity 22 during plastic injection into the mold 16.

The second runner segment 36 is fanned immediately adjacent the second portion 38 of the article-defining cavity 22 to permit the easy distribution of molten plastic resin from the second runner segment 36 into the second portion 38 of the article-defining cavity 22 as described in detail hereinbelow.

The first runner segment 32, the spill cavity 34 and the second runner segment 36 collectively define a second resin flow path which extends from the first portion 30 of the article-defining cavity 22 to the portion 38 of the article-defining cavity 22 outside the article-defining cavity 22.

The Injection Molding Process

Initially, a quantity of molten plastic is injected through the nozzle 12 into the first portion 30 of the article-defining cavity 22. The plastic may be any thermoplastic and works especially well with glass or mineral-filled thermoplastic polyester. The quantity is sufficient to provide the mass of the article to be molded but desirably less than the quantity which would fill the mold cavity 22.

Then, the charge of pressurized gas is introduced into the first portion 30 of the article-defining cavity 22 upon substantial completion of the injection of the quantity of molten plastic. The charge of pressurized gas creates an interior void 40 and displaces molten plastic resin from the first portion 30 of the article-defining cavity 22, into the first runner segment 32, into the spill cavity 34, and thence into the second runner segment 36 for eventual disposition within the second portion 38 of the article-defining cavity 22 to fill the second portion 38 with plastic resin. In this way, molten plastic resin is diverted from the void or gas channel 40 into the second portion 38 of the article-defining cavity 22 which is typically a hard-to-fill area. The charge of pressurized gas is maintained in the gas channel 40 and hollows out the first portion 30 of the article-defining cavity 22.

In other words, the gas which flows into the mold 16 is maintained in pressure and duration in amount time sufficient to displace a controlled quantity of plastic from the first portion 30 of the article-defining cavity 22. The gas tends to displace the hottest and most fluent plastic in the central portion of the first portion 30 of the article-defining cavity 22. Consequently, the molded plastic article has a hollow interior where the least viscous plastic has been displaced. The presence of the gas affords savings in weight and material usage. Added benefits include enhanced surface quality due to the outward pressure exerted by the gas and reduced cycle time due to displacement of the relatively hot plastic from the central part of the upper portion 30 of the article-defining cavity 22.

Then the article is permitted to solidify within the mold cavity while the internal gas pressure is maintained.

Then the pressurized gas is vented from the interior of the molded article in preparation of opening the mold 16. Numerous ways of venting are possible such as described in U.S. Pat. No. 4,101,614 to Friederich or as described in U.S. Pat. No. 4,781,554.

Finally, the completed plastic article, generally indicated at 42 in FIG. 2, is removed from the mold. The plastic article 42 includes a sprue portion 44, first and second runner portions 46 and 48, respectively, and spill portion 50, all of which can be broken off and removed before the part is shipped.

The advantages accruing to the method and system of the present invention are numerous. For the method and system allows one to put large gas channels on parts with thin nominal walls without large spillovers. Also, the method and system allows one to use the material that would normally be in a large spill over to act as secondary gating in remote nominal wall areas of the part that are hard-to-fill.

Finally, the method allows one to add a second or third gas channel that are not connected to the primary gas channel on the part itself.

While the best mode for carrying out the invention has been described in detail, those familiar with the art to which this invention relates will recognize various alternative designs and embodiments for practicing the invention as defined by the following claims.

What is claimed is:

1. An injection molding system for injection molding a hollow plastic article, the system including a source of pressurized fluid, an injection nozzle for supplying molten plastic resin, and a mold having an injection aperture, an article-defining cavity and a primary resin flow path which extends from the injection aperture to a first portion of the article-defining cavity, wherein the improvement comprises:

a secondary resin flow path extending outside of the article-defining cavity from the first portion of the article-defining cavity to a second portion of the article-defining cavity to communicate a first portion of the molten plastic resin displaced from the first portion of the article-defining cavity to the second portion of the article-defining cavity by a charge of pressurized gas from the source of pressurized fluid and means for communicating the charge of pressurized gas from the source of pressurized fluid to the first portion of the article-defining cavity to displace the first portion of the molten plastic resin through the secondary resin flow path.

\* \* \* \* \*